(12) United States Patent
Liu et al.

(10) Patent No.: US 12,464,579 B2
(45) Date of Patent: Nov. 4, 2025

(54) INFORMATION INTERACTION METHOD AND APPARATUS, AND ELECTRONIC DEVICE

(71) Applicant: BEIJING BYTEDANCE NETWORK TECHNOLOGY CO., LTD., Beijing (CN)

(72) Inventors: Ning Liu, Beijing (CN); Hanlin Wang, Beijing (CN); Bixing Sheng, Beijing (CN); Tao Chen, Beijing (CN); Yao Yang, Beijing (CN); Shaodong Gao, Beijing (CN); Daqian Lu, Beijing (CN); Shun Huang, Beijing (CN); Lingfeng Li, Beijing (CN); Bin Zhu, Beijing (CN); Bin Cheng, Beijing (CN)

(73) Assignee: DOUYIN VISION CO., LTD., Beijing (CN)

( * ) Notice: Subject to any disclaimer, the term of this patent is extended or adjusted under 35 U.S.C. 154(b) by 480 days.

(21) Appl. No.: 17/925,522

(22) PCT Filed: May 13, 2021

(86) PCT No.: PCT/CN2021/093500
§ 371 (c)(1),
(2) Date: Nov. 15, 2022

(87) PCT Pub. No.: WO2021/228174
PCT Pub. Date: Nov. 18, 2021

(65) Prior Publication Data
US 2023/0199873 A1    Jun. 22, 2023

(30) Foreign Application Priority Data
May 15, 2020  (CN) .......................... 202010416767.8

(51) Int. Cl.
*H04L 65/403* (2022.01)
*H04L 65/1069* (2022.01)
(Continued)

(52) U.S. Cl.
CPC ......... *H04W 76/14* (2018.02); *H04L 65/1069* (2013.01); *H04L 65/403* (2013.01); *H04W 4/80* (2018.02)

(58) Field of Classification Search
CPC ....... H04W 76/14; H04W 4/80; H04W 84/12; H04W 8/005; H04W 76/34; H04L 65/1069; H04L 65/403; H04L 65/1066
See application file for complete search history.

(56) References Cited

U.S. PATENT DOCUMENTS 9,774,824 B1 *  9/2017  Brady ..................... H04W 4/80
10,841,113 B2 * 11/2020 Stuntebeck ......... H04L 12/1818
(Continued)

FOREIGN PATENT DOCUMENTS

CN          102804761 A     11/2012
CN          103607398 A      2/2014
(Continued)

OTHER PUBLICATIONS

Wang Chuanlei et al.; Theory and Practice of Personal Information Management; Hefei University of Technology Press; Feb. 2012; p. 230-233 (contains English Translation).
(Continued)

*Primary Examiner* — Cindy Trandai
(74) *Attorney, Agent, or Firm* — BakerHostetler

(57) ABSTRACT

Disclosed are an information interaction method and apparatus, and an electronic device. A specific implementation of the method comprises: acquiring a first near-field communication signal; extracting, from the first near-field communication signal, first pairing information for pairing with a
(Continued)

multimedia conference terminal; and sending the first pairing information to a server, so as to instruct the server to determine a target multimedia conference terminal on the basis of the first pairing information and to establish a communication connection between the target multimedia conference terminal and a user terminal device. By means of the implementation, the convenience for a user to control a multimedia conference terminal is improved. In addition, the overall cost of a multimedia conference system can be reduced.

19 Claims, 4 Drawing Sheets

(51) Int. Cl.
*H04W 4/80* (2018.01)
*H04W 76/14* (2018.01)

(56) References Cited

U.S. PATENT DOCUMENTS

| | | | | |
|---|---|---|---|---|
| 11,736,307 | B2* | 8/2023 | Bahl | G10L 19/167 |
| | | | | 709/204 |
| 2012/0185291 | A1* | 7/2012 | Ramaswamy | G06Q 10/1093 |
| | | | | 705/7.19 |
| 2012/0272055 | A1* | 10/2012 | Jung | H04W 12/08 |
| | | | | 713/153 |
| 2014/0315487 | A1* | 10/2014 | Lu | H04B 5/48 |
| | | | | 455/41.1 |
| 2015/0029300 | A1 | 1/2015 | Saxena et al. | |
| 2017/0272477 | A1 | 9/2017 | Konno | |
| 2018/0063203 | A1* | 3/2018 | Marella | H04L 65/403 |
| 2018/0198535 | A1* | 7/2018 | Cirit | H04W 12/12 |
| 2018/0332119 | A1* | 11/2018 | Hong | H04W 4/80 |
| 2019/0018381 | A1* | 1/2019 | Grødum | G05B 19/042 |
| 2019/0166166 | A1 | 5/2019 | Chang | |
| 2019/0266822 | A1* | 8/2019 | Ruggieri | G07C 9/00 |
| 2019/0294625 | A1* | 9/2019 | Bentz | G06K 7/10237 |
| 2020/0059629 | A1 | 2/2020 | McArdle | |

FOREIGN PATENT DOCUMENTS

| | | |
|---|---|---|
| CN | 104601324 A | 5/2015 |
| CN | 105247854 A | 1/2016 |
| CN | 105659589 A | 6/2016 |
| CN | 107197420 A | 9/2017 |
| CN | 108111322 A | 6/2018 |
| CN | 110324562 A | 10/2019 |
| CN | 110430558 A | 11/2019 |
| CN | 110519551 A | 11/2019 |
| CN | 112311753 A | 2/2021 |
| KR | 10-1980337 B1 | 8/2019 |

OTHER PUBLICATIONS

International Search Report and Written Opinion for International Application No. PCT/CN2021/093500, mailed Aug. 12, 2021, 17 Pages with English translation of Search Report.

* cited by examiner

INFORMATION INTERACTION METHOD AND APPARATUS, AND ELECTRONIC DEVICE

CROSS REFERENCE TO RELATED APPLICATION

The present application is a national phase application of PCT international patent application PCT/CN2021/093500, filed on May 13, 2021 which claims priority to Chinese Patent Application No. 202010416767.8, titled "INFORMATION INTERACTION METHOD AND APPARATUS, AND ELECTRONIC DEVICE", filed on May 15, 2020 with the China National Intellectual Property Administration, both of which are incorporated herein by reference in their entireties.

FIELD

The disclosure relates to the field of Internet technology, and in particular to an information interaction method, an information interaction apparatus and an electronic device.

BACKGROUND

With the development of Internet technology, users located in different places can communicate through a multimedia conference application. The multimedia conference application may usually be installed in a multimedia conference terminal.

The multimedia conference terminal may be set in a conference room. A user can carry out a multimedia conference with other users through the multimedia conference terminal in the conference room.

SUMMARY

This summary is provided to introduce concepts in a simplified form, the concepts are described in detail in the detailed description of the embodiments below. This summary is not intended to identify key features or essential features of the claimed technical solution, nor is it intended to be used to limit the scope of the claimed technical solution.

An information interaction method, an information interaction apparatus and an electronic device are provided according to embodiments of the present disclosure.

In a first aspect, an information interaction method is provided according to an embodiment of the disclosure. The method includes: acquiring a first near-field communication signal; extracting first pairing information, for pairing with a multimedia conference terminal, from the first near-field communication signal; and sending the first pairing information to a serving terminal, to instruct the server to determine a target multimedia conference terminal based on the first pairing information and establish a communication connection between the target multimedia conference terminal and a user terminal.

In a second aspect, an information interaction method is provided according to an embodiment of the disclosure. The method includes: receiving first pairing information for pairing sent from a user terminal, where the first pairing information is extracted by the user terminal and extracted from a first near-field communication signal acquired by the user terminal; matching the first pairing information with information of a multimedia conference terminal; determining a target multimedia conference terminal based on a result of the matching; and establishing a communication connection between the target multimedia conference terminal and the user terminal.

In a third aspect, an information interaction apparatus is provided according to an embodiment of the disclosure. The apparatus includes: an acquiring unit, configured to acquire a first near-field communication signal; an extracting unit, configured to extract first pairing information, for pairing with a multimedia conference terminal, from the first near-field communication signal; and a sending unit, configured to send the first pairing information to a serving terminal, to instruct the server to determine a target multimedia conference terminal based on the first pairing information and establish a communication connection between the target multimedia conference terminal and a user terminal.

In a fourth aspect, an information interaction apparatus is provided according to an embodiment of the disclosure. The apparatus includes: a receiving unit, configured to receive first pairing information for pairing sent from a user terminal, where the first pairing information is extracted by the user terminal and extracted from a first near-field communication signal acquired by the user terminal; a matching unit, configured to match the first pairing information with information of a multimedia conference terminal; a determining unit, configured to determine a target multimedia conference terminal based on a result of the matching; and a communication connection establishing unit, configured to establish a communication connection between the target multimedia conference terminal and the user terminal.

In a fifth aspect, an electronic device is provided according to an embodiment of the present disclosure. The electronic device includes one or more processors and a storage apparatus storing one or more programs. The one or more programs, when executed by the one or more processors, cause the one or more processors to perform the information interaction method described in the above first aspect or the information interaction method described in the above second aspect.

In a sixth aspect, a computer-readable medium is provided according to an embodiment of the present disclosure. The computer-readable medium stores a computer program. The computer program, when executed by a processor, causes the processor to perform the information interaction method described in the above first aspect or the information interaction method described in the above second aspect.

According to the information interaction method, an information interaction apparatus and an electronic device provided in the embodiments of the disclosure, a first near-field communication signal is acquired, first pairing information for pairing with a multimedia conference terminal is extracted from the first near-field communication signal, and the first pairing information is sent to a serving terminal, to instruct the server to determine a target multimedia conference terminal based on the first pairing information and establish a communication connection between the target multimedia conference terminal and a user terminal. A user can control the multimedia conference terminal without using a control terminal of the multimedia conference terminal, thereby improving the convenience of the user to control the multimedia conference terminal. In addition, an overall cost of a multimedia conference system can be reduced.

BRIEF DESCRIPTION OF THE DRAWINGS

With reference to the drawings and specific embodiments below, the above and other features, advantages and aspects of embodiments of the present disclosure become more apparent. Throughout the drawings, the same or similar reference numerals indicate the same or similar elements. It should be understood that the drawings are schematic, and components and elements are unnecessarily drawn in scale.

DETAILED DESCRIPTION

Embodiments of the present disclosure are described in detail hereinafter with reference to the drawings. Although the drawings show some embodiments of the present disclosure, it should be understood that the present disclosure may be implemented by various embodiments and are not limited to be implemented by the embodiments clarified herein. The embodiments described in the present disclosure are intended to illustrate the present disclosure thoroughly and completely. It should be understood that the drawings and the embodiments are only schematic, and are not intended to limit the protection scope of the present disclosure.

It should be understood that, steps described in the method embodiments of the present disclosure may be performed in different orders and/or performed in parallel. In addition, the method embodiments may include additional steps and/or the shown steps may be omitted. The scope of the present disclosure is not limited thereto.

Term "including" and variations thereof adopted herein is inclusive, that is "including but not limited to". The term "based on" means "at least partially based on". The term "an embodiment" means "at least one embodiment", and the term "another embodiment" means "at least one another embodiment". The term "some embodiments" means "at least some embodiments". Definitions of other terms are provided below.

It should be noted that, the terms "first" "second" and so on mentioned in the present disclosure are only used to distinguish different apparatuses, modules or units, rather than limit an order of functions performed by the apparatus, module or unit or limit interdependence.

It should be noted that, the terms "a" and "multiple" mentioned in the present disclosure are schematic rather than restrictive, and should be understood as "one or more" by those skilled in the art, otherwise explicitly illustrated in the context.

Names of messages or information interacted between multiple apparatuses in the embodiments of the present disclosure are illustrative rather than limit the scope of the message or information.

Figure 1:
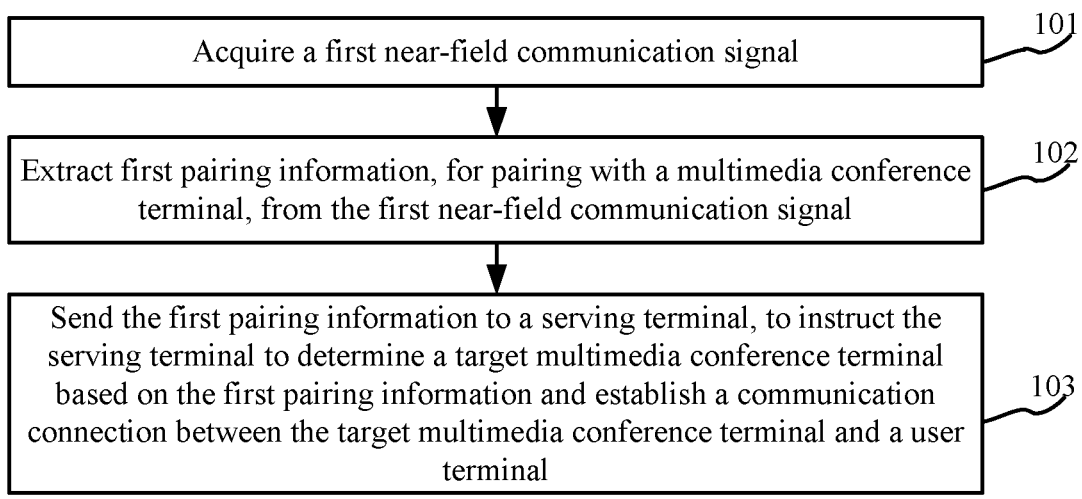
FIG. 1 is a flowchart of an information interaction method according to an embodiment of the present disclosure.

Reference is made to FIG. 1, which is a flowchart of an information interaction method according to an embodiment of the present disclosure. As shown in FIG. 1, the information interaction method may be applied to a user terminal and may include the steps 101 to 103.

Step 101, acquire a first near-field communication signal.

The user terminal here may be a terminal device installed with an application for controlling a multimedia conference terminal.

The multimedia conference terminal here may refer to a device carrying a multimedia conference software or system, such as, a video conference all-in-one machine, a video conference television.

The user terminal may acquire the first near-field communication signal sent by other electronic devices in real time.

The near-field communication signal refers to a near-distance wireless communication signal, which involves a short-distance wireless communication technology and includes a Wi-Fi hotspot signal, a Bluetooth signal, an ultrasonic signal, etc. Different near-field communication signals have different communication ranges. For example, a communication range of the ultrasonic signal is usually within 6 meters, a communication range of the Bluetooth signal is usually within 10 meters, a communication range of a Wi-Fi hotspot signal is usually from 5 meters to 10 meters.

In this embodiment, the first near-field communication signal includes at least one of an ultrasonic signal sent from the multimedia conference terminal, a Bluetooth signal sent from the multimedia conference terminal and a Wi-Fi signal of a network environment.

Step 102, extract first pairing information, for pairing with a multimedia conference terminal, from the first near-field communication signal.

In this embodiment, the user terminal may first determine whether the received first near-field communication signal include the first near-field communication signal sent from the multimedia conference terminal.

For example, the first near-field communication signal may include a type field indicating a type of an electronic device which sends the first near-field communication signal. Different types of electronic devices correspond to different type fields.

The first near-field communication signal is determined as the first near-field communication signal sent from the multimedia conference terminal in a case that a type field of the near-field communication signal is the same as a type field corresponding to the multimedia conference terminal.

The first near-field communication signal sent from the multimedia conference terminal also includes the first pairing information for pairing.

The user terminal may extract the first pairing information from the first near-field communication signal.

The first pairing information may include letters, numbers and/or symbols or the like.

Step 103, send the first pairing information to a serving terminal, to instruct the server to determine a target multimedia conference terminal based on the first pairing information and establish a communication connection between the target multimedia conference terminal and a user terminal.

The user terminal may send the first pairing information obtained in step 102 to the server through a wired communication connection or a wireless communication connection.

After receiving the first pairing information, the server may determine the target multimedia conference terminal based on the first pairing information. After determining the target multimedia conference terminal, a communication connection between the target multimedia conference terminal and the user terminal is established.

The user terminal may be installed with an application for controlling the multimedia conference terminal. After establishing the communication connection, the user can control the target multimedia conference terminal through the application for controlling the multimedia conference terminal installed on the user terminal. For example, the user may send an instruction for starting a multimedia conference to the target multimedia conference terminal by using the use terminal. After receiving the instruction for starting the multimedia conference from the use terminal, the target multimedia conference terminal enters a multimedia conference mode, for example, the target multimedia conference terminal starts to collect multimedia data information of the user such as audio information and/or video information, and sends the collected multimedia data information to a multimedia conference serving terminal. The user may also send an instruction for adjusting audio parameters and video parameters of the multimedia conference to the target multimedia conference terminal by using the use terminal. The target multimedia conference terminal may adjust the audio parameters and the video parameters of the multimedia conference based on the instruction for adjusting the audio parameters and the video parameters of the multimedia conference sent from the user.

In existing technologies, when using the multimedia conference terminal to perform the multimedia conference, the user needs to use a dedicated controller that match the multimedia conference terminal to control the multimedia conference terminal, such as starting the multimedia conference, adjusting the audio parameters and video parameters of the multimedia conference. The above operation requires the user to use the dedicated controller to control the multimedia conference terminal. The user needs to find the dedicated controller first, and then use the dedicated controller to control the multimedia conference terminal. The convenience of the user to control the multimedia conference terminal through the dedicated controller is poor.

In this embodiment, a first near-field communication signal is acquired, first pairing information for pairing with a multimedia conference terminal is extracted from the first near-field communication signal, and the first pairing information is sent to a serving terminal, to instruct the server to determine a target multimedia conference terminal based on the first pairing information and establish a communication connection between the target multimedia conference terminal and a user terminal. A user can control the multimedia conference terminal by using the user terminal, thereby improving the convenience of the user to control the multimedia conference terminal. In addition, an overall cost of a multimedia conference system can be reduced.

It should be noted that in some application scenarios, the user may also perform a preset control operation to the target multimedia conference terminal based on a near-field communication signal including a control instruction sent from the user terminal. For example, the preset control operation may include starting a multimedia conference, adjusting audio parameters and video parameters of the multimedia conference, or the like. For example, the near-field communication signal may include an ultrasonic signals, a Bluetooth signal, a Wi-Fi hotspot signal, or the like.

In some optional implementations of this embodiment, the first near-field communication signal includes the ultrasonic signal sent from the multimedia conference terminal. The ultrasonic signal includes the first pairing information generated by the multimedia conference terminal based on second pairing information. The second pairing information is sent from the server to the multimedia conference terminal in advance.

In some application scenarios, the first pairing information includes a pairing code. The pairing code may include letters, numbers and/or symbols.

The second pairing information sent from the server to the multimedia conference terminal in advance includes the pairing code.

The second pairing information may be continuously updated at a preset time period.

Because the pairing code corresponding to the second pairing information may be continuously updated at a preset time period, the security of the established communication connection can be ensured.

In these optional implementations, the frequency of the ultrasonic signal ranges from 19 KHz to 20 KHz. An effective transmission distance of the ultrasonic signal is within 5 meters. The ultrasonic signal may carry the first pairing information. Different multimedia conference terminals may be effectively distinguished based on the ultrasonic signal sent from the multimedia conference terminal.

In these implementations, the acquiring a first near-field communication signal in step 101 includes receiving the ultrasonic signal with an audio receiver.

The audio receiver may be an audio receiver fixed in the user terminal, or may be an audio receiver externally connected to the user terminal.

In these optional implementations, the above step 103 may include: sending the first pairing information, extracted from the ultrasonic signal, to the serving terminal, to instruct the server to determine the target multimedia conference terminal based on the first pairing information and the second pairing information and establish a communication connection between the target multimedia conference terminal and the user terminal.

The first pairing information is carried by the ultrasonic signal. The user terminal may extract the first pairing information from the acquired ultrasonic signal sent by the multimedia conference terminal, and send the extracted first pairing information to the serving terminal. The server matches the received first pairing information with the second pairing information which is sent to multiple multimedia conference terminals in advance, and determines, according to a result of the matching, the target multimedia conference terminal from the multiple multimedia conference terminals. The multiple multimedia conference terminals correspond to different second pairing information.

In these optional implementations, the multimedia conference terminal sends the ultrasonic signal carrying the first pairing information. The user terminal acquires the ultrasonic signal and extracts the first pairing information from the ultrasonic signal. The user terminal sends the first pairing information to the serving terminal, and the server determines the target multimedia conference terminal and establishes a communication connection between the user terminal and the multimedia conference terminal according to the first pairing information. Because the effective transmission distance of the ultrasonic signal is short, the ultrasonic signal sent by only one multimedia conference terminal is efficient at a time instant. As a result, in a case that the target multimedia conference terminal is determined based on the first pairing information carried by the ultrasonic signal, the accuracy of determining the target multimedia conference terminal can be improved.

In some optional implementations of this embodiment, the first near-field communication signal includes the Bluetooth signal sent from the multimedia conference terminal, and before step 102, the information interaction method further includes following steps 1 to 3.

Step 1, determine a distance between the user terminal and the multimedia conference terminal based on the acquired Bluetooth signal.

Step 2, determine, based on the distance, whether the multimedia conference terminal and the user terminal are located in a same conference room.

Step 3, extract the first pairing information from the Bluetooth signal in response to determining, based on the distance, that the multimedia conference terminal and the user terminal are located in a same conference room, where the first pairing information includes identity information of the multimedia conference terminal.

In these optional implementations, by using an existing indoor positioning technology based on Bluetooth signal, a rough physical distance of the user terminal and the multimedia conference terminal sending the Bluetooth signal may be calculated by taking a signal intensity (RSSI—Received Signal Strength Indication) into an experience formula. Then it is determined, based on the physical distance, whether the multimedia conference terminal and the user terminal are located in a same room.

If it is determined that the multimedia conference terminal and the user terminal are located in a same room (that is, in the same conference room), the first pairing information may be extracted from the Bluetooth signal. The first pairing information may include the identity information of the multimedia conference terminal.

In some application scenarios, the identity information of the multimedia conference terminal may include equipment encoding information of the multimedia conference terminal.

In other application scenarios, the identity information of the multimedia conference terminal may also include the identity information which is sent from the server to the multimedia conference terminal and which is used for indicating the identity of the serving terminal.

In these application scenarios, the identity information which is sent from the server to the multimedia conference terminal and which is used for indicating the identity of the server may be continuously updated at a preset time period.

In these optional implementations, the target multimedia conference terminal is determined based on the Bluetooth signal sent from the multimedia conference terminal, thereby ensuring the accuracy of determining the target multimedia conference terminal.

In some optional implementations of this embodiment, the first near-field communication signal includes the Wi-Fi signal, and step 102 may include extracting identity information of a Wi-Fi device included in the Wi-Fi signal, and generating the first pairing information based on the identity information.

Step 103 includes: sending the first pairing information to the serving terminal, to instruct the server to determine the target multimedia conference terminal based on the identity information of the Wi-Fi device in the first pairing information and the identity information of the Wi-Fi device in a network environment where multiple multimedia conference terminals are located.

The identity information of the Wi-Fi device in a network environment where the multimedia conference terminal is located is sent from the multimedia conference terminal to the serving terminal.

The Wi-Fi signal may include a Wi-Fi fingerprint for the network environment where the user terminal is located, which includes SSIDs (Service Set Identifiers) and BSSIDs (basic SSIDs) of the Wi-Fi network. The SSIDs may be the name of the Wi-Fi network, and BSSIDs may be a number of 48 bit (usually a MAC address of the AP). The multimedia conference terminal uploads the Wi-Fi fingerprint information read by the multimedia conference terminal to the serving terminal, and the user terminal uploads the Wi-Fi fingerprint information read by the user terminal to the serving terminal. When the server determines that the received two pieces of Wi-Fi fingerprint information are the same, a communication connection may be established between the multimedia conference terminal and the user terminal, and the pairing is completed. After the pairing is completed, the user terminal may send a control command to the serving terminal. The server forwards the control command to the multimedia conference terminal to control the multimedia conference terminal.

In these optional implementations, the communication connection between the multimedia conference terminal and the user terminal may be established based on the Wi-Fi signal of the network environment where the multimedia conference terminal is located and the Wi-Fi signal of the network environment where the user terminal is located. A Wi-Fi function is a common function of electronic devices at present. The communication connection between the multimedia conference terminal and the user terminal is realized based on the Wi-Fi function, on the one hand, it is convenient for the user to control the multimedia conference terminal, on the other hand, the cost of the multimedia conference system may be further reduced.

It should be noted that the target multimedia conference terminal corresponding to the user terminal may be determined by combining different first near-field communication signals. For example, the target multimedia conference terminal corresponding to the user terminal is determined by combining the ultrasonic signal sent from the user terminal, the ultrasonic signal sent from the multimedia conference terminal, and the identity information of the Wi-Fi device in the network environment where the user terminal is located. That is, the first pairing information may include the pairing code carried by the ultrasonic signal sent from the multimedia conference terminal, and the identity information of the Wi-Fi device in the network environment where the user terminal is located. The server determines the target multimedia conference terminal by combining the pairing code sent to each multimedia conference terminal and the identity information of the Wi-Fi device in the network environment where the user terminal is located.

In some optional implementations of this embodiment, after sending the first pairing information to the server to instruct the server to successfully establish the communication connection between the target multimedia conference terminal and the user terminal, the information interaction method further includes following operations.

Firstly, continuously acquire a second near-field communication signal at a preset time interval.

Secondly, send the second near-field communication signal to the serving terminal, where the server determines whether to keep the communication connection based on the second near-field communication signal.

The preset time interval may be any time interval, such as 3 minutes, 5 minutes.

The second near-field communication signal at least includes one of an ultrasonic signal sent from the multimedia conference terminal, a Bluetooth signal sent from the multimedia conference terminal, and a Wi-Fi signal of the network environment.

The second near-field communication signal may be sent from the target multimedia conference terminal to the user terminal.

The second near-field communication signal may include the identity information of the target multimedia conference terminal. The user terminal sends the received second near-field communication signal to the serving terminal.

In these optional implementations, the server may determine whether the user terminal still corresponds to the target multimedia conference terminal based on the second near-field communication signal. Here, whether the user terminal still corresponds to the target multimedia conference terminal may be considered as whether the user is still in the conference room corresponding to the target multimedia conference terminal.

If the user terminal still corresponds to the target multimedia conference terminal, the communication connection between the user terminal and the target multimedia conference terminal is kept. Otherwise, the communication connection between the user terminal and the target multimedia conference terminal is disconnected.

In these application scenarios, the user terminal continuously acquires the nearby second near-field communication signal at a preset time interval, and sends the second near-field communication signal to the serving terminal, so that the server determines whether to keep the communication connection between the user terminal and the target multimedia conference terminal. In this way, the user can exit the communication connection between the user terminal and the target multimedia conference terminal without manually performing an operation of exiting the communication connection, thereby further providing convenience for the user. In addition, the security of multimedia conference information associated with the communication connection can also be guaranteed.

In some optional implementations of this embodiment, the information interaction method also includes: performing, according to an operating instruction of a user, at least one of following operations through the communication connection: an operation of entering or exiting a multimedia conference, an operation of adjusting a preset parameter of audio and video of the multimedia conference, and an operation of performing a preset process on meeting content.

The operation of entering or exiting a multimedia conference may include: initiating the multimedia conference, joining the multimedia conference, inviting participants, leaving the conference or the like.

The operation of adjusting a preset parameter of the multimedia conference may include: an operation of adjusting an audio parameter of the multimedia conference (such as adjusting a volume), and an operation of adjusting a video parameter of the multimedia conference (such as adjusting a brightness and a clarity of the video).

The operation of performing a preset process on meeting content may include recording the meeting content or the like.

That is, the user can control the multimedia conference terminal through the user terminal, and the user terminal can replace a corresponding control device of the multimedia conference terminal.

Figure 2:
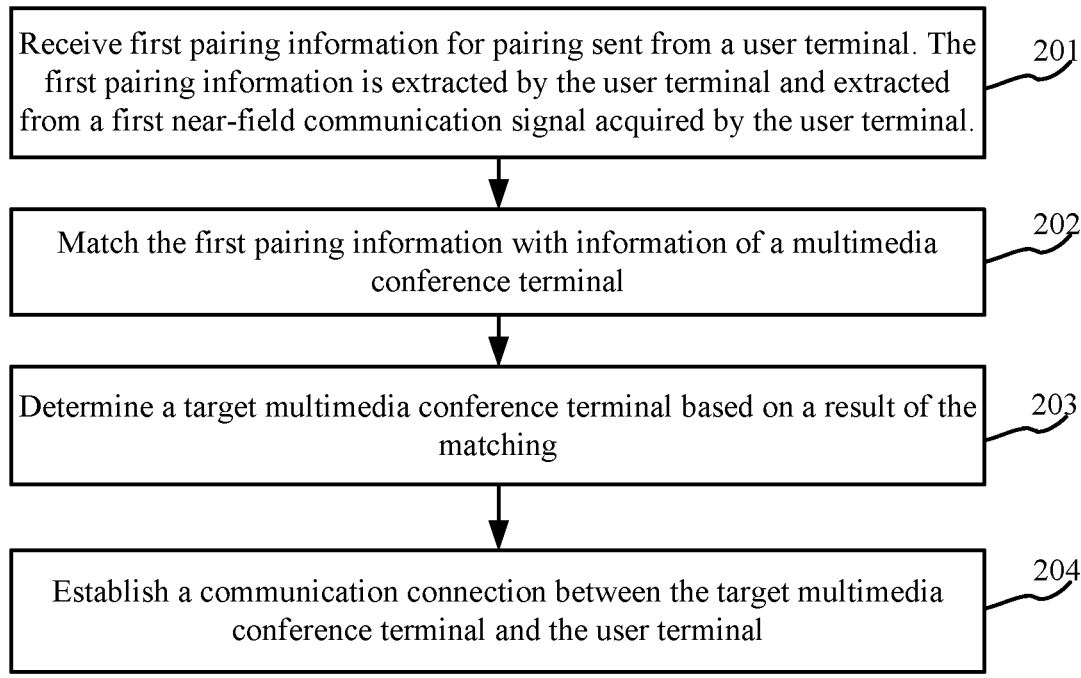
FIG. 2 is a flowchart of another information interaction method according to an embodiment of the present disclosure.

Reference is made to FIG. 2, which is a flowchart of another information interaction method according to an embodiment of the present disclosure. For example, the information interaction method may be applied to a serving terminal. As shown in FIG. 2, the information interaction method includes following steps 201 to 204.

Step 201, receive first pairing information for pairing sent from a user terminal.

The first pairing information is extracted by the user terminal and extracted from a first near-field communication signal acquired by the user terminal. The first pairing information may include letters, numbers and/or symbols or the like.

The first near-field communication signal includes at least one of an ultrasonic signal sent from the multimedia conference terminal, a Bluetooth signal sent from the multimedia conference terminal and a Wi-Fi signal of a network environment.

After receiving the first pairing information sent by the user terminal, the server may match the first pairing information with the information of the multimedia conference terminal.

The information of the multimedia conference terminal may be information corresponding to each of multiple candidate multimedia conference terminals.

Step 202, match the first pairing information with information of a multimedia conference terminal.

Step 203, determine a target multimedia conference terminal based on a result of the matching.

Step 204, establish a communication connection between the target multimedia conference terminal and the user terminal.

For description of the steps 201 to 204, the description of the embodiments shown in FIG. 1 may be referred to, and which is not repeated here.

In the information interaction method according to this embodiment, first pairing information sent from a user terminal is received, the first pairing information is matched with information of a multimedia conference terminal, a target multimedia conference terminal is determined based on a result of the matching, and a communication connection between the target multimedia conference terminal and the user terminal is established. In this way, a user can control the multimedia conference terminal without using a control terminal of the multimedia conference terminal, thereby improving the convenience of the user to control the multimedia conference terminal. In addition, an overall cost of a multimedia conference system can be reduced.

In some optional implementations of this embodiment, the first near-field communication signal includes the ultrasonic signal sent from the multimedia conference terminal, the first pairing information is generated by the multimedia conference terminal based on second pairing information, where the second pairing information is sent from the server to the multimedia conference terminal in advance.

Here, the information of the multimedia conference terminal may be the second pairing information corresponding to each of the multiple candidate multimedia conference terminals.

The second pairing information sent from the server to the candidate multimedia conference terminal may be continuously updated at a preset time period. The preset time period may be 3 minutes or 5 minutes.

In some application scenarios, in a case that the multimedia conference terminal does not establish a communication connection with the user terminal, the server may continuously send the updated second pairing information to the multimedia conference terminal at a preset time period. After the multimedia conference terminal establishes a communication connection with the user terminal, and when the communication connection is kept, the updated second pairing information may not be sent to the multimedia conference terminal. When the communication connection is disconnected, the updated second pairing information may be sent to the multimedia conference terminal.

The second pairing information may include a preset pairing code. The pairing code may include letters, numbers and/or symbols.

In these optional implementations, the step 202 may include: matching the first pairing information with the second pairing information corresponding to each of multiple candidate multimedia conference terminals.

The step 203 may include: determining the candidate multimedia conference terminal, corresponding to the second pairing information matched with the first pairing information, as the target multimedia conference terminal.

In these optional implementations, the multimedia conference terminal sends the ultrasonic signal carrying the first pairing information. The user terminal acquires the ultrasonic signal and extracts the first pairing information from the ultrasonic signal. The user terminal sends the first pairing information to the serving terminal, and the server determines the target multimedia conference terminal and establishes a communication connection between the user terminal and the multimedia conference terminal according to the first pairing information. Because the effective transmission distance of the ultrasonic signal is short, the ultrasonic signal sent by only one multimedia conference terminal is efficient at a time instant. As a result, in a case that the target multimedia conference terminal is determined based on the first pairing information carried by the ultrasonic signal, the accuracy of determining the target multimedia conference terminal can be improved.

In some optional implementations of this embodiment, the first pairing information includes identity information of the multimedia conference terminal. The identity information of the multimedia conference terminal is determined by the user terminal based on the Bluetooth signal sent from the Bluetooth device of the multimedia conference terminal.

In these optional implementations, the step 202 may include: matching the identity information of the multimedia conference terminal in the first pairing information with identity information corresponding to each of multiple candidate multimedia conference terminals.

The identity information of the multimedia conference terminal may be a device number of the multimedia conference terminal, and may also be the identity information sent from the server to distinguish different multimedia conference terminals.

The server may match the identity information of the multimedia conference terminal in the first pairing information sent from the user terminal with the identity information corresponding to each of the multiple candidate multimedia conference terminals. The candidate multimedia conference terminal matched with the identity information of the multimedia conference terminal in the first pairing information sent from the user terminal is determined as the target multimedia conference terminal.

The server may establish a communication connection between the target multimedia conference terminal and the user terminal, so that the user terminal can control the above target multimedia conference terminal.

In some optional implementations of this embodiment, the first pairing information may include identity information of a Wi-Fi device in a network environment where the multimedia conference terminal is located. The step 202 may include matching the identity information of the Wi-Fi device with identity information of a Wi-Fi device corresponding to each of multiple candidate multimedia conference terminals.

The identity information of the Wi-Fi device may indicate an electronic device that sends a Wi-Fi hotspot signal.

The Wi-Fi signal may include a Wi-Fi fingerprint for the network environment where the user terminal is located, which includes SSIDs (Service Set Identifiers) and BSSIDs (basic SSIDs) of the Wi-Fi network. The SSIDs may be the name of the Wi-Fi network, and BSSIDs may be a number of 48 bit (usually a MAC address of the AP). The multimedia conference terminal uploads the Wi-Fi fingerprint information read by the multimedia conference terminal to the serving terminal, and the user terminal uploads the Wi-Fi fingerprint information read by the user terminal to the serving terminal. When the server determines that the received two pieces of Wi-Fi fingerprint information are the same, a communication connection may be established between the multimedia conference terminal and the user terminal, and the pairing is completed. After the pairing is completed, the user terminal may send a control command to the serving terminal. The server forwards the control command to the multimedia conference terminal to control the multimedia conference terminal.

In these optional implementations, the communication connection between the multimedia conference terminal and the user terminal may be established based on the Wi-Fi signal of the network environment where the multimedia conference terminal is located and the Wi-Fi signal of the network environment where the user terminal is located. A Wi-Fi function is a common function of electronic devices at present. The communication connection between the multimedia conference terminal and the user terminal is realized based on the Wi-Fi function, on the one hand, it is convenient for the user to control the multimedia conference terminal, on the other hand, the cost of the multimedia conference system may be further reduced.

In some optional implementations of this embodiment, the information interaction method may further include: refusing to receive new first pairing information in a communication connection locked state.

The communication connection locked state is triggered in response to receiving a communication connection locking request for locking the established communication connection sent by a user. In response to receiving the communication connection locking request for locking the established communication connection sent by the user, a function for establishing a communication connection between the target multimedia conference terminal and the user terminal may be set to the communication connection locked state.

The communication connection locking request may be sent by the user through the user terminal, or it may be sent by the user through the control device of the multimedia conference terminal.

After receiving the locking request from the user, the server may refuse to receive new first pairing information during a maintain period of the locked state. In practice, after receiving the locking request from the user, the server may determine whether the locking request is to take effect. After determining that the locking request takes effect, the server sets the function for establishing a communication connection between the target multimedia conference terminal and the user terminal to the communication connection locked state. During a maintain period of the communication connection locked state, the server does not receive new first pairing information.

The new first pairing information may be first pairing information which is extracted from the acquired near-field communication signal and which is sent to the server by other users through their terminal devices during the communication connection locked state.

The maintain period of the communication connection locked state may be a time period from a moment when the user sends the locking request to a moment when the unlocking request sent from the user is received. The unlocking request is a unlocking request for unlocking the communication connection state.

Furthermore, optionally, the information interaction method may also include: receiving new first pairing information in response to receiving an unlocking request for unlocking the communication connection locked state sent by the user.

After receiving the unlocking request sent by the user, the server may reset the communication connection locked state to be invalid and start receiving new first pairing information.

In these optional implementations, before receiving the unlocking request, the established communication connection between the target multimedia conference terminal and the user terminal remains valid.

In these optional implementations, whether to receive the first pairing information sent by other terminal devices may be determined based on the communication connection locking request and unlocking request form the user. Therefore, the security of the current multimedia conference to the target multimedia conference terminal can be improved.

In some optional implementations of this embodiment, the information interaction method also includes: refusing a remote control operation to the target multimedia conference terminal performed by a user through the established communication connection in a remote control locked state for the target multimedia conference terminal.

The remote control locked state is triggered in response to receiving a control locking request, for locking the remote control for the target multimedia conference terminal, sent by the user.

In the remote control locked state, when receiving a control locking request, for locking the remote control sent by the user, the server refuses the user to perform the remote control operation to the target multimedia conference terminal through the established communication connection.

The control locking request may be sent by the user through the user terminal or may be sent by the user through the control device of the multimedia conference terminal.

In a large meeting place, if multiple people control the same device, there is competition. In some serious conference scenarios, it is intended to limit the remote operation of the participants on the device. The user may be controlled, based on the control locking request, not to perform remote operation to the target multimedia conference terminal by the user terminal through the communication connection.

The remote operation may include, for example, adjusting the volume of the multimedia conference, adjusting the view of the multimedia conference, adjusting the video brightness and definition of the multimedia conference, etc.

In these optional implementations, the user is controlled, based on the control locking request, not to perform the remote control operation to the target multimedia conference terminal through the user terminal, which is beneficial to avoid the competition phenomenon that occurs when multiple people intends to remotely control the target multimedia conference terminal.

In some optional implementations of this embodiment, the information interaction method also includes: disconnecting the communication connection in response to a condition of disconnecting the communication connection is met at a current moment.

The condition of disconnecting the communication connection includes one of: a time interval between the current moment and a moment when a latest second near-field communication signal is received being greater than a preset second time threshold; determining, based on a positioning manner of a Bluetooth signal, that the user terminal is not in a conference room where the target multimedia conference terminal is located; identify information of a Wi-Fi device corresponding to a Wi-Fi signal in the first pairing information being not matched with identify information of a Wi-Fi device corresponding to a Wi-Fi signal of the multimedia conference terminal; and receiving a terminating request for terminating the communication connection sent by a user.

The second near-field communication signal is continuously acquired by the user terminal at a preset time interval and sent to the serving terminal. The server determines whether to keep the communication connection according to the second near-field communication signal.

The terminating request for terminating the communication connection sent by a user may be a terminating request from the user which is used to request to terminate the communication connection between the terminal device used by the user and the target multimedia terminal, or a terminating request sent by a user with a preset authority to terminate the communication connection between the terminal equipment of other users and the target multimedia conference terminal.

(1) In a case that a time interval between the current moment and a moment when a latest second near-field communication signal is received is greater than a preset second time threshold, the server disconnects the communication connection. (2) In a case that it is determined, based on a positioning manner of a Bluetooth signal, that the user terminal is not in a conference room where the target multimedia conference terminal is located, the server disconnects the communication connection. (3) In a case that identify information of a Wi-Fi device corresponding to a Wi-Fi signal in the first pairing information is not matched with identify information of a Wi-Fi device corresponding to a Wi-Fi signal of the multimedia conference terminal, the server disconnects the communication connection between the target multimedia conference terminal and the user terminal. The above three ways to disconnect the communication connection can realize the disconnection of the communication connections without the user's operation. On the one hand, the user's operation may be reduced. On the other hand, the security of multimedia conference content may be ensured.

Figure 3:
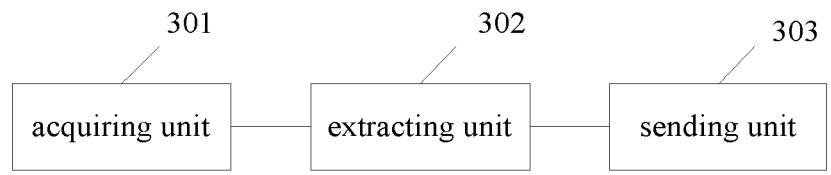
FIG. 3 is a schematic structural diagram of an information interaction apparatus according to an embodiment of the present disclosure.

Reference is made to FIG. 3, as an implementation of the methods described above, the present disclosure provides an embodiment of an information interaction apparatus, the apparatus embodiment corresponds to the method embodiment shown in FIG. 1, and the apparatus may specifically be used in various electronic devices. For example, the apparatus may be used in a user terminal.

As shown in FIG. 3, the information interaction apparatus according to the embodiment includes: an acquiring unit 301, an extracting unit 302 and a sending unit 303. The acquiring unit 301 is configured to acquire a first near-field communication signal. The extracting unit 302 is configured to extract first pairing information, for pairing with a multimedia conference terminal, from the first near-field communication signal. The sending unit 303 is configured to send the first pairing information to a serving terminal, to instruct the server to determine a target multimedia conference terminal based on the first pairing information and establish a communication connection between the target multimedia conference terminal and a user terminal.

In this embodiment, the specific processing of the acquiring unit 301, the extracting unit 302 and the sending unit 303 of the information interaction apparatus and the technical effects brought by the units may refer to the relevant descriptions of steps 101, 102 and 103 in the corresponding embodiment of FIG. 1 respectively, which will is not repeated here.

In some optional implementations of this embodiment, the first near-field communication signal includes at least one of an ultrasonic signal sent from the multimedia conference terminal, a Bluetooth signal sent from the multimedia conference terminal and a Wi-Fi signal of a network environment.

In some optional implementations of this embodiment, the first near-field communication signal includes the ultrasonic signal sent from the multimedia conference terminal, the ultrasonic signal includes the first pairing information generated by the multimedia conference terminal based on second pairing information, where the second pairing information is sent from the server to the multimedia conference terminal in advance. The sending unit 303 is further configured to: send the first pairing information, extracted from the ultrasonic signal, to the serving terminal, to instruct the server to determine the target multimedia conference terminal based on the first pairing information and the second pairing information and establish a communication connection between the target multimedia conference terminal and the user terminal.

In some optional implementations of this embodiment, the acquiring unit 301 is further configured to receive the ultrasonic signal with an audio receiver.

In some optional implementations of this embodiment, the first near-field communication signal includes the Bluetooth signal sent from the multimedia conference terminal, and the information interaction apparatus further includes a distance determination unit (not show in the drawing). The distance determination unit is configured to: before the extracting unit extracts the first pairing information for pairing with the multimedia conference terminal from the first near-field communication signal, perform following operations: determining a distance between the user terminal and the multimedia conference terminal based on the Bluetooth signal; determining, based on the distance, whether the multimedia conference terminal and the user terminal are located in a same conference room; and extracting the first pairing information from the Bluetooth signal in response to determining, based on the distance, that the multimedia conference terminal and the user terminal are located in a same conference room, where the first pairing information includes identity information of the multimedia conference terminal.

In some optional implementations of this embodiment, the first near-field communication signal includes the Wi-Fi signal, and the extracting unit 302 is further configured to extract identity information of a Wi-Fi device included in the Wi-Fi signal, and generate the first pairing information based on the identity information. The sending unit 303 is further configured to: send the first pairing information to the serving terminal, to instruct the server to determine the target multimedia conference terminal based on the identity information of the Wi-Fi device in the first pairing information and the identity information of the Wi-Fi device in a network environment where multiple multimedia conference terminals are located.

In some optional implementations of this embodiment, the information interaction apparatus further includes a communication connection keeping unit (not shown in the drawing). The communication connection keeping unit is configured to: after the sending unit sends the first pairing information to the server to instruct the server to successfully establish the communication connection between the target multimedia conference terminal and the user terminal, continuously acquire a second near-field communication signal at a preset time interval, where the second near-field communication signal is sent from the target multimedia conference terminal to the user terminal; and send the second near-field communication signal to the serving terminal, where the server determines whether to keep the communication connection based on the second near-field communication signal.

In some optional implementations of this embodiment, the information interaction apparatus further includes a remote control unit (not shown in the drawing). The remote control unit is configured to perform, according to an operating instruction of a user, at least one of following operations through the communication connection: an operation of entering or exiting a multimedia conference, an operation of adjusting a preset parameter of the multimedia conference, and an operation of performing a preset process on meeting content.

Figure 4:
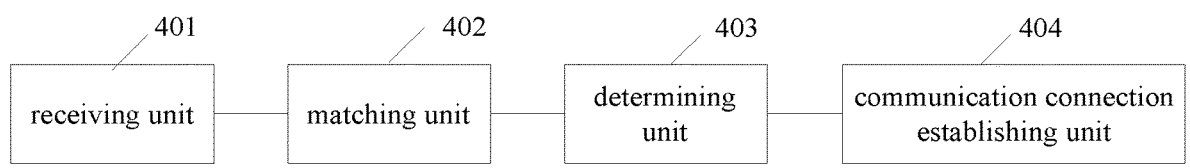
FIG. 4 is a schematic structural diagram of another information interaction apparatus according to an embodiment of the present disclosure.

Reference is made to FIG. 4, as an implementation of the methods described above, the present disclosure provides an embodiment of an information interaction apparatus, the apparatus embodiment corresponds to the method embodiment shown in FIG. 2, and the apparatus may specifically be used in various electronic devices. For example, the apparatus may be used in a serving terminal.

As shown in FIG. 4, the information interaction apparatus according to the embodiment is applied to the serving terminal, and includes a receiving unit 401, a matching unit 402, a determining unit 403 and a communication connection establishing unit 404. The receiving unit 401 is configured to receive first pairing information for pairing sent from a user terminal, where the first pairing information is extracted by the user terminal and extracted from a first near-field communication signal acquired by the user terminal. The matching unit 402 is configured to match the first pairing information with information of a multimedia conference terminal. The determining unit 403 is configured to determine a target multimedia conference terminal based on a result of the matching. The communication connection establishing unit 404 is configured to establish a communication connection between the target multimedia conference terminal and the user terminal.

In this embodiment, the specific processing of the receiving unit 401, the matching unit 402, the determining unit 403 and the communication connection establishing unit 404 of the information interaction apparatus and the technical effects brought by the units may refer to the relevant descriptions of steps 201, 202, 203 and 204 in the corresponding embodiment of FIG. 2 respectively, which will is not repeated here.

In some optional implementations of this embodiment, the first near-field communication signal includes at least one of an ultrasonic signal sent from the multimedia conference terminal, a Bluetooth signal sent from the multimedia conference terminal and a Wi-Fi signal of a network environment.

In some optional implementations of this embodiment, the first near-field communication signal includes the ultrasonic signal sent from the multimedia conference terminal, the first pairing information is generated by the multimedia conference terminal based on second pairing information, where the second pairing information is sent from the server to the multimedia conference terminal in advance. The matching unit 402 is further configured to match the first pairing information with the second pairing information corresponding to each of multiple candidate multimedia conference terminals. The determining unit 403 is further configured to determine the candidate multimedia conference terminal, corresponding to the second pairing information matched with the first pairing information, as the target multimedia conference terminal.

In some optional implementations of this embodiment, the first pairing information includes identity information of the multimedia conference terminal, and the identity information of the multimedia conference terminal is determined by the user terminal based on the Bluetooth signal sent from a Bluetooth device of the multimedia conference terminal. The matching unit 402 is further configured to match the identity information of the multimedia conference terminal in the first pairing information with identity information corresponding to each of multiple candidate multimedia conference terminals.

In some optional implementations of this embodiment, the first pairing information includes identity information of a Wi-Fi device in a network environment where the multimedia conference terminal is located. The matching unit 402 is further configured to match the identity information of the Wi-Fi device with identity information of a Wi-Fi device corresponding to each of multiple candidate multimedia conference terminals.

In some optional implementations of this embodiment, the information interaction apparatus further includes a communication connection locking unit (not shown in the drawing). The communication connection locking unit is configured to refuse to receive new first pairing information in a communication connection locked state, where the communication connection locked state is triggered in response to receiving a communication connection locking request for locking the established communication connection sent by a user.

In some optional implementations of this embodiment, the information interaction apparatus further includes an unlocking unit (not shown in the drawing). The unlocking unit is configured to receive new first pairing information in response to receiving an unlocking request for unlocking the communication connection locked state sent by the user.

In some optional implementations of this embodiment, the information interaction apparatus further includes a control locking unit (not shown in the drawing). The control locking unit is configured to refuse a remote control operation to the target multimedia conference terminal performed by a user through the established communication connection in a remote control locked state for the target multimedia conference terminal, where the remote control locked state is triggered in response to receiving a control locking request, for locking the remote control for the target multimedia conference terminal, sent by the user.

In some optional implementations of this embodiment, the information interaction apparatus further includes a communication connection disconnecting unit (not shown in the drawing). The communication connection disconnecting unit is configured to disconnect the communication connection in response to a condition of disconnecting the communication connection is met at a current moment.

The condition of disconnecting the communication connection includes one of: a time interval between the current moment and a moment when a latest second near-field communication signal is received being greater than a preset second time threshold; determining, based on a positioning manner of a Bluetooth signal, that the user terminal is not in a conference room where the target multimedia conference terminal is located; a Wi-Fi device corresponding to a Wi-Fi signal in the first pairing information being not matched with a Wi-Fi device corresponding to a Wi-Fi signal of the multimedia conference terminal; and receiving a terminating request for terminating the communication connection sent by a user. The second near-field communication signal is continuously sent by the target multimedia conference terminal to the user terminal at a preset time interval, and the second near-field communication signal is received by the user terminal and sent from the user terminal to a serving terminal.

Figure 6:
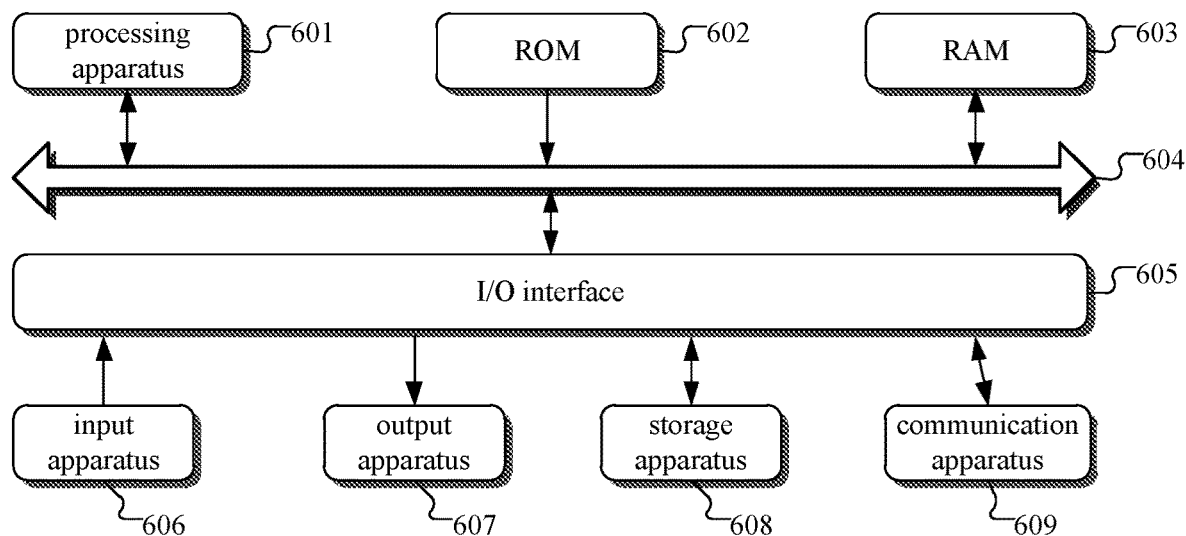
FIG. 6 is a schematic diagram of a basic structure of an electronic device according to an embodiment of the present disclosure.

Reference is made to FIG. 6, which is an exemplary system architecture to which an information interaction method according to an embodiment of the present disclosure may be applied.

Figure 5:
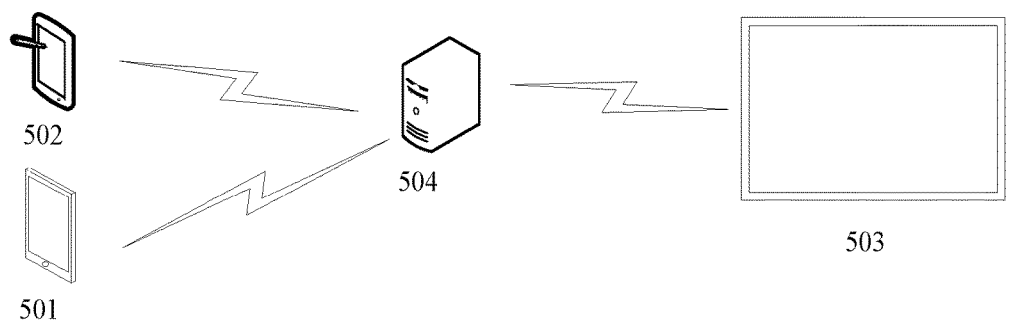
FIG. 5 is an exemplary system architecture to which an information interaction method according to an embodiment of the present disclosure may be applied.

As shown in FIG. 5, the system architecture may include terminal devices 501, 502, a multimedia conference terminal 503, and a server 504. A communication connection is established over the terminal devices 501, 502, the multimedia conference terminal 503, and the server 504. The network may include various connection types, such as wired, wireless communication links, or fiber optic cables.

The terminal devices 501, 502 may interact with the server 504 through the network to receive or send messages and the like. Various client applications, such as a multimedia conference application, a web browser application, a search application, may be installed on the terminal devices 501, 502. Client applications in the terminal devices 501 and 502 may send a multimedia data stream to the server 504.

The terminal devices 501, 502 may be hardware or software. When the terminal devices 501, 502 are hardware, they may be various electronic devices that have a display screen, including but not limited to smart phones, tablet computers, laptops and desktops, etc. When the terminal devices 501, 502 are software, they may be installed in the electronic devices listed above. They may be implemented as multiple software or software modules, or may be implemented as a single software or software module, which is not limited here.

The multimedia conference terminal 503 may be an audio conference terminal or a video conference terminal. The multimedia conference terminal 503 may receive information sent over the network by the server 504, such as information for establishing a communication connection, and processes the above information, such as establishing communication connection with the server according to the information for establishing the communication connection sent by the server.

The server 504 may be a server that can provide various services. For example, the server 504 may receive request information sent from the terminal devices 501, 502, analyze and process the above request information, and send a result of analyzing and processing to the terminal devices 501, 502.

The server 504 may be hardware or software. When the server 604 is hardware, it may be implemented as a distributed server cluster composed of multiple servers, or may be implemented as a single server. When the server 604 is software, it may be implemented as multiple software or software modules (for example, multiple software or software modules for providing distributed services), or may be implemented as a single software or software module. There is no specific limitation here.

It should be noted that the information interaction method provided by the embodiments of the present disclosure may be executed by the server 504, and correspondingly, the information interaction apparatus may be provided in the server 504. The information interaction method provided by the embodiments of the present disclosure may also be executed by the terminal devices 501, 502, and correspondingly, the information interaction apparatus may be provided in the terminal devices 501, 502

It should be understood that the numbers of terminal devices, networks and servers in FIG. 5 are merely illustrative. There may be any number of terminal devices, networks and servers according to implementation needs.

Reference is made to FIG. 6 which shows a schematic structural diagram of an electronic device (such as the server or terminal devices in FIG. 5) for implementing the embodiments of the present disclosure. The terminal device in the embodiments of the present disclosure may include but not limited to mobile terminals such as a mobile phone, a notebook computer, a digital broadcast receiver, a personal digital assistance (PDA), a tablet computer (PAD), a portable multi-media player (PMP) and a vehicle terminal (such as a vehicle navigation terminal); and fixed terminals such as digital TV and a desktop computer. The electronic device shown in FIG. 6 is schematic, and is not intended to limit functions and scope of the embodiments of the present disclosure.

As shown in FIG. 6, the electronic device may include a processing apparatus (such as a central processor and a graphic processor) 601. The processing apparatus may perform various appropriate actions and processing by executing programs stored in a read-only memory (ROM) 602 or programs uploaded from a storage apparatus 608 to a random access memory (RAM) 603. Various programs and data required for operations of the electronic device are also stored in the RAM 603. The processing apparatus 601, the ROM 602 and the RAM 603 are connected to each other through the bus 604. An input/output (I/O) interface 605 is also connected to the bus 604.

Generally, the following components are connected to the I/O interface 605: an input apparatus 606 such as a touch screen, a touch panel, a keyboard, a mouse, a camera, a microphone, an accelerometer, and gyroscope; an output apparatus 607 such as a liquid crystal display (LCD), a loudspeaker and a vibrator; a storage apparatus 608 such as a magnetic tape and a hard disk; and a communication apparatus 609. The communication apparatus 609 may allow the electronic device to communicate with other device in a wired or wireless manner to exchange data. Although FIG. 6 shows the electronic device provided with various apparatuses, it should be understood that not all shown apparatuses are necessary. Alternatively, more or less apparatuses may be included.

According to the embodiments of the present disclosure, a process described in the flowchart may be implemented by computer software programs. For example, according to an embodiment of the present disclosure, a computer program product including computer program carried on a non-transient computer readable medium is provided. The computer program includes program codes for performing the method shown in the flowchart. In such embodiment, the computer program may be downloaded and installed from the network through the communication apparatus 609, installed from the storage apparatus 608 or installed from the ROM 602. The computer program is executed by the processing apparatus 601 to perform functions defined in the methods described in the embodiments of the present disclosure.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof. In some embodiments of the present disclosure, the computer readable storage medium may be a tangible medium including or storing programs. The programs may be used by an instruction execution system, apparatus or device, or may be used in combination with the instruction execution system, apparatus or device. In some embodiments of the present disclosure, a computer readable signal medium may include a data signal in a baseband or propagated as a part of carrier. The computer readable signal medium carries computer readable program codes. The propagated data signal may include but not limited to an electromagnetic signal, an optical signal or any combination thereof. The computer readable signal medium may be any computer readable medium other than the computer readable storage medium. The computer readable signal medium may send, propagate or transmit programs used by the instruction execution system, apparatus or device or the programs used in combination with the instruction execution system, apparatus or device. The program code included in the computer readable medium may be transmitted via any appropriate medium, including but not limited to an electric wire, an optical fiber, radio frequency (RF) or any appropriate combination thereof.

In some embodiments, the client and the server may perform communication by using any known network protocol such as Hyper Text Transfer Protocol (HTTP) or any network protocol to be developed, and may connect with digital data in any form or carried in any medium (for example, a communication network). The communication network includes a local area network (LAN), a wide area network (WAN), an international network (for example the internet), a peer-to-peer network (for example ad hoc peer-to-peer network), and any known network or network to be developed.

The computer readable storage medium may be included in the electronic device, or the computer readable storage medium may be independent from the electronic device, i.e., not being installed in the electronic device.

The computer readable medium carries one or more programs. The one or more programs, when executed by the electronic device, cause the electronic device to: acquire a first near-field communication signal; extract first pairing information, for pairing with a multimedia conference terminal, from the first near-field communication signal; and send the first pairing information to a serving terminal, to instruct the server to determine a target multimedia conference terminal based on the first pairing information and establish a communication connection between the target multimedia conference terminal and a user terminal.

Alternatively, the one or more programs, when executed by the electronic device, cause the electronic device to: receive first pairing information for pairing sent from a user terminal, where the first pairing information is extracted by the user terminal and extracted from a first near-field communication signal acquired by the user terminal; match the first pairing information with information of a multimedia conference terminal; determine a target multimedia conference terminal based on a result of the matching; and establish a communication connection between the target multimedia conference terminal and the user terminal.

Computer program codes for performing operations of embodiments of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams shown in the drawings show a system architecture, function and operation which may be implemented by the system, method and computer program product according to the embodiments of the present disclosure. Each block in the flowcharts or the block diagram may represent a part of a module, a program section or codes including executable instructions for implementing specified logic functions. It should be noted that, in alternative embodiment, functions denoted in the blocks may be performed in an order different from the order denoted in the drawing. For example, operations in two blocks connected successively may be performed in parallel, or may be performed in an opposite order, depending on the involved function. It should be noted that, each block in the block diagrams and/or flowcharts, and a combination of blocks in the block diagrams and/or flowcharts may be implemented by a dedicated hardware system for performing specified functions or operations, or may be implemented by a combination of dedicated hardware and computer instructions.

Units involved in the embodiments of the present disclosure may be implemented by software or hardware. Names of the units do not limit the units in a certain case. For example, the acquiring unit may also be described as "a unit for acquiring a first near-field communication signal".

The functions described above may be partially performed by one or more hardware logic components. For example, non-restrictively, exemplary types of hardware logic components that may be used include: a field programmable gate array (FPGA), an application specific integrated circuit (ASIC), an application specific standard product (ASSP), a system on chip (SOC), a complex programmable logic device (CPLD) and so on.

In the context of the present disclosure, the machine readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof.

The preferred embodiments and the technical principles of the present disclosure are described above. It should be understood by those skilled in the art that, the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example, the technical solution formed by replacement between the above technical features and technical features with similar functions disclosed (not limited) in the present disclosure.

In addition, although operations are depicted in a specific order, this should not be understood as requiring them to be performed in the shown specific order or in the sequential order. Under certain circumstances, multitasking and parallel processing may be advantageous. Similarly, although a number of implementation details are included in the above discussion, they should not be interpreted as limiting the scope of this disclosure. Some of the characteristics described in the context of a single embodiment can also be implemented in combination in a single embodiment. Conversely, the various characteristics described in the context of a single embodiment can also be implemented in multiple embodiments, either individually or in any appropriate sub-combination.

Although the matter has been described in language specific to structural features and/or method logical actions, it should be understood, however, that the subject matter defined in the accompanying claim is not necessarily limited to the specific features or actions described above. In contrast, the specific features and actions described above are only an example form of implementing the claim.

The invention claimed is:

1. An information interaction method, comprising:
   acquiring a first near-field communication signal;
   extracting first pairing information, for pairing with a multimedia conference terminal, from the first near-field communication signal; and
   sending the first pairing information to a server, to instruct the server to determine a target multimedia conference terminal based on the first pairing information and establish a communication connection between the target multimedia conference terminal and a user terminal,
   wherein the first near-field communication signal comprises an ultrasonic signal sent from the multimedia conference terminal, the ultrasonic signal comprises the first pairing information generated by the multimedia conference terminal based on second pairing information, the second pairing information is sent from the server to the multimedia conference terminal in advance, and wherein the sending the first pairing information to a server, to instruct the server to determine a target multimedia conference terminal based on the first pairing information and establish a communication connection between the target multimedia conference terminal and a user terminal comprises:

sending the first pairing information extracted from the ultrasonic signal to the server, to instruct the server to determine the target multimedia conference terminal based on the first pairing information and the second pairing information and establish the communication connection between the target multimedia conference terminal and the user terminal.

2. The method according to claim 1, wherein the first near-field communication signal further comprises at least one of a Bluetooth signal sent from the multimedia conference terminal or a Wi-Fi signal of a network environment.

3. The method according to claim 2, wherein the first near-field communication signal comprises the Bluetooth signal sent from the multimedia conference terminal, and before extracting the first pairing information, for pairing with the multimedia conference terminal, from the first near-field communication signal, the method further comprises:

determining a distance between the user terminal and the multimedia conference terminal based on the Bluetooth signal;

determining, based on the distance, whether the multimedia conference terminal and the user terminal are located in a same conference room; and extracting the first pairing information from the Bluetooth signal in response to determining, based on the distance, that the multimedia conference terminal and the user terminal are located in a same conference room, wherein the first pairing information comprises identity information of the multimedia conference terminal.

4. The method according to claim 2, wherein the first near-field communication signal comprises the Wi-Fi signal, and the extracting first pairing information, for pairing with a multimedia conference terminal, from the first near-field communication signal comprises:

extracting identity information of a Wi-Fi device comprised in the Wi-Fi signal, and generating the first pairing information based on the identity information; and the sending the first pairing information to a server, to instruct the server to determine a target multimedia conference terminal based on the first pairing information and establish a communication connection between the target multimedia conference terminal and a user terminal comprises:

sending the first pairing information to the server, to instruct the server to determine the target multimedia conference terminal based on the identity information of the Wi-Fi device in the first pairing information and the identity information of the Wi-Fi device in a network environment where a plurality of multimedia conference terminals are located.

5. The method according to claim 1, wherein the acquiring a first near-field communication signal comprises:

receiving the ultrasonic signal with an audio receiver.

6. The method according to claim 1, wherein after sending the first pairing information to the server and successfully establishing the communication connection between the target multimedia conference terminal and the user terminal, the method further comprises:

continuously acquiring a second near-field communication signal at a preset time interval, wherein the second near-field communication signal is sent from the target multimedia conference terminal to the user terminal; and sending the second near-field communication signal to the server, wherein the server determines whether to keep the communication connection based on the second near-field communication signal.

7. The method according to claim 1, further comprising:

performing, according to an operating instruction of a user, at least one of following operations through the communication connection: an operation of entering or exiting a multimedia conference, an operation of adjusting a preset parameter of the multimedia conference, and an operation of performing a preset process on meeting content.

8. The method according to claim 1, wherein the method is applied to the user terminal.

9. An information interaction method, comprising:

receiving first pairing information for pairing sent from a user terminal, wherein the first pairing information is extracted by the user terminal and extracted from a first near-field communication signal acquired by the user terminal;

matching the first pairing information with information of a multimedia conference terminal;

determining a target multimedia conference terminal based on a result of the matching; and establishing a communication connection between the target multimedia conference terminal and the user terminal, wherein the first near-field communication signal comprises an ultrasonic signal sent from the multimedia conference terminal, the ultrasonic signal comprises the first pairing information generated by the multimedia conference terminal based on second pairing information, the second pairing information is sent to the multimedia conference terminal in advance, and wherein determining the target multimedia conference terminal and establishing the communication connection between the target multimedia conference terminal and the user terminal comprises:

receiving the first pairing information extracted from the ultrasonic signal, determining the target multimedia conference terminal based on the first pairing information and the second pairing information, and establishing the communication connection between the target multimedia conference terminal and the user terminal.

10. The method according to claim 9, wherein the first near-field communication signal further comprises at least one of a Bluetooth signal sent from the multimedia conference terminal or a Wi-Fi signal of a network environment.

11. The method according to claim 10, wherein the first pairing information comprises identity information of the multimedia conference terminal, and the identity information of the multimedia conference terminal is determined by the user terminal based on the Bluetooth signal sent from a Bluetooth device of the multimedia conference terminal, and the matching the first pairing information with information of a multimedia conference terminal comprises:

matching the identity information of the multimedia conference terminal in the first pairing information with identity information corresponding to each of a plurality of candidate multimedia conference terminals.

12. The method according to claim 10, wherein the first pairing information comprises identity information of a Wi-Fi device in a network environment where the multimedia conference terminal is located, and the matching the first pairing information with information of a multimedia conference terminal comprises:

matching the identity information of the Wi-Fi device with identity information of a Wi-Fi device corresponding to each of a plurality of candidate multimedia conference terminals.

13. The method according to claim 9, wherein the matching the first pairing information with information of a multimedia conference terminal comprises:

matching the first pairing information with the second pairing information corresponding to each of a plurality of candidate multimedia conference terminals; and wherein the determining a target multimedia conference terminal based on a result of the matching comprises:

determining the candidate multimedia conference terminal, corresponding to the second pairing information matched with the first pairing information, as the target multimedia conference terminal.

14. The method according to claim 9, further comprising:

refusing to receive new first pairing information in a communication connection locked state, wherein the communication connection locked state is triggered in response to receiving a communication connection locking request for locking the established communication connection sent by a user.

15. The method according to claim 14, further comprising:

receiving new first pairing information in response to receiving an unlocking request for unlocking the communication connection locked state sent by the user.

16. The method according to claim 9, further comprising:

refusing a remote control operation to the target multimedia conference terminal performed by a user through the established communication connection in a remote control locked state for the target multimedia conference terminal, wherein the remote control locked state is triggered in response to receiving a control locking request, for locking the remote control for the target multimedia conference terminal, sent by the user.

17. The method according to claim 9, further comprising:

disconnecting the communication connection in response to a condition of disconnecting the communication connection is met at a current moment, wherein the condition of disconnecting the communication connection comprises one of: a time interval between the current moment and a moment when a latest second near-field communication signal is received being greater than a preset second time threshold; determining, based on a positioning manner of a Bluetooth signal, that the user terminal is not in a conference room where the target multimedia conference terminal is located; a Wi-Fi device corresponding to a Wi-Fi signal in the first pairing information being not matched with a Wi-Fi device corresponding to a Wi-Fi signal of the multimedia conference terminal; and receiving a terminating request for terminating the communication connection sent by a user, wherein the second near-field communication signal is continuously sent by the target multimedia conference terminal to the user terminal at a preset time interval, and the second near-field communication signal is received by the user terminal and sent from the user terminal to a server.

18. The method according to claim 9, wherein the method is applied to a server.

19. A computer-readable non-transitory medium storing a computer program, wherein the computer program, when executed by a processor, causes the processor to:

acquire a first near-field communication signal;

extract first pairing information, for pairing with a multimedia conference terminal, from the first near-field communication signal; and send the first pairing information to a server, to instruct the server to determine a target multimedia conference terminal based on the first pairing information and establish a communication connection between the target multimedia conference terminal and a user terminal, wherein the first near-field communication signal comprises an ultrasonic signal sent from the multimedia conference terminal, the ultrasonic signal comprises the first pairing information generated by the multimedia conference terminal based on second pairing information, the second pairing information is sent from the server to the multimedia conference terminal in advance, and wherein sending the first pairing information to a server, to instruct the server to determine a target multimedia conference terminal based on the first pairing information and establish a communication connection between the target multimedia conference terminal and a user terminal comprises:

sending the first pairing information extracted from the ultrasonic signal to the server, to instruct the server to determine the target multimedia conference terminal based on the first pairing information and the second pairing information and establish the communication connection between the target multimedia conference terminal and the user terminal.

* * * * *